June 20, 1972  L. T. OLSEN  3,671,353
PROCESS FOR THE CONTINUOUS PRODUCTION OF
LAMINATED WOOD OF THE PARQUET TYPE
Filed March 26, 1969  3 Sheets-Sheet 1

INVENTOR.
LEIF THORVALD OLSEN
BY
McGlew and Toren
ATTORNEYS

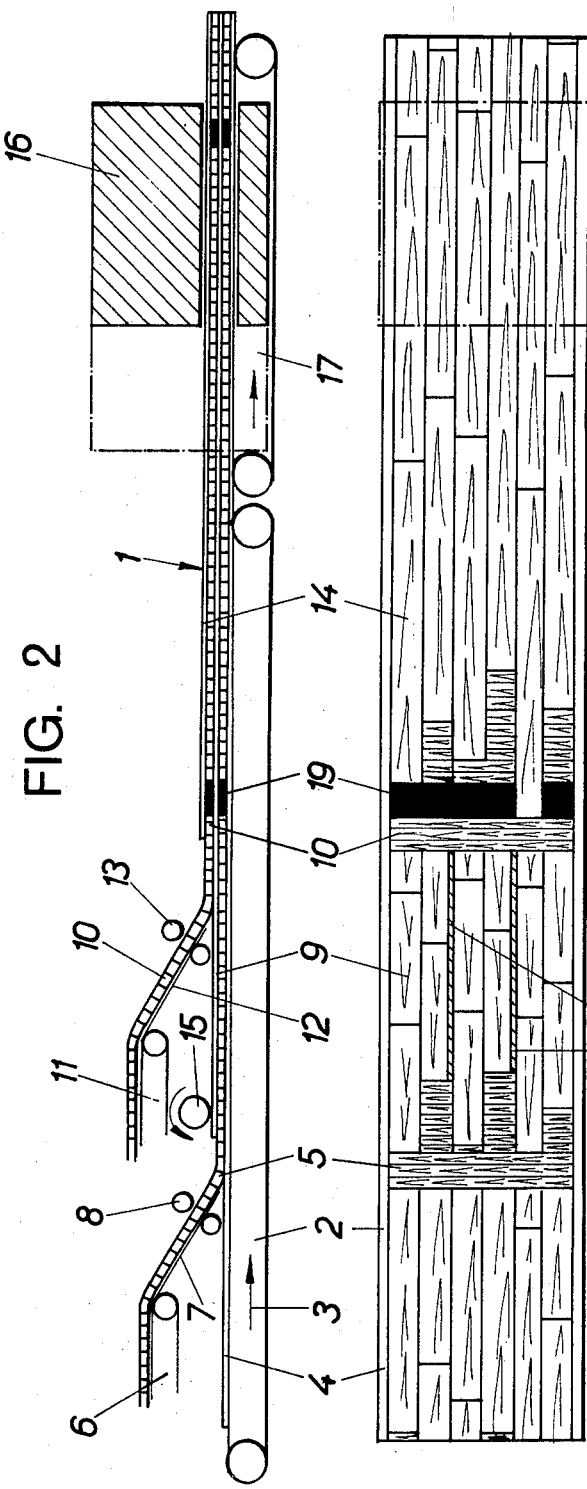

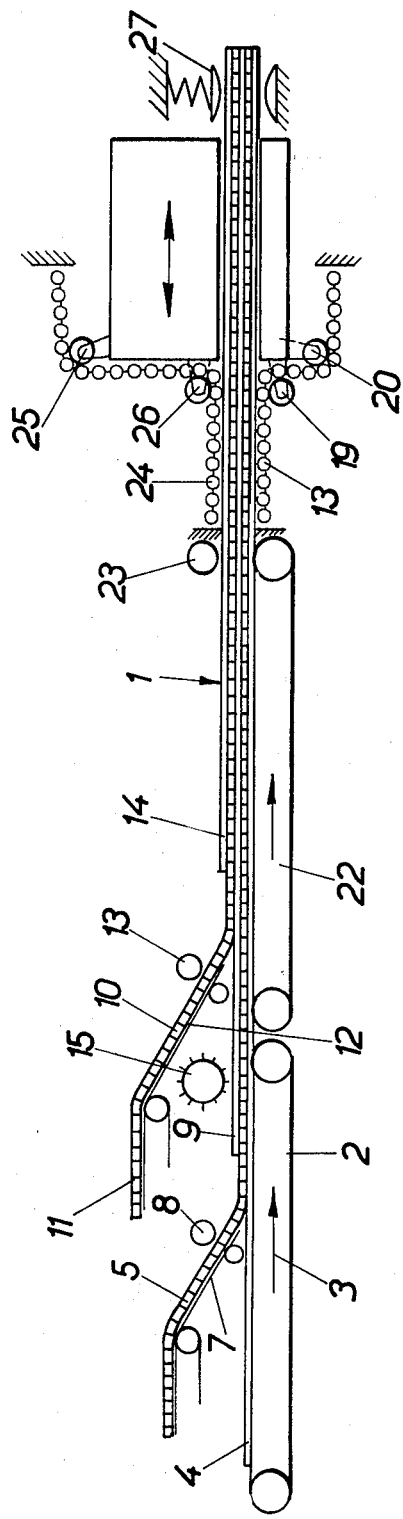

United States Patent Office 3,671,353
Patented June 20, 1972

3,671,353
PROCESS FOR THE CONTINUOUS PRODUCTION OF LAMINATED WOOD OF THE PARQUET TYPE
Leif T. Olsen, Boen, Norway, assignor to Boen Bruk, Kristiansand S., Norway
Filed Mar. 26, 1969, Ser. No. 810,589
Claims priority, application Norway, Apr. 1, 1968, 1,252; June 27, 1968, 2,554; Feb. 11, 1969, 526
Int. Cl. B32b 31/10, 31/20
U.S. Cl. 156—302                     4 Claims

ABSTRACT OF THE DISCLOSURE

The invention relates to a process for the step by step pressing of material which is fed continuously, particularly wood laminate such as laminated parquet, and the like, in which the pressing is carried out by means of a press which can move to and fro in the feed direction of the material and supported by rollers or wheels. The press carries out the pressing and the heating of the laminate in order to harden the glue while moving in the feed direction of the material and which is open during the return movement, and the press is pushed forward by the material sheet itself and one thereby achieves a desired mutual compression of the lamellae in the horizontal direction.

---

This invention relates to a process for the continuous production of wood laminate, especially laminated parquet, consisting of lamellae in the form of narrow boards or laths, laid cross-wise and glued and pressed together by means of a press which can move to and fro. Further the invention relates to a device for carrying out the process.

Parquet of this type usually has an underside of thin, relatively long and narrow lamellae oriented in the longitudinal direction of the parquet strips. Upon this layer, there is positioned an intermediate layer of thin lamellae which lie across the first layer and finally on top of this layer lies the wearing surface, or visible surface, itself which consists of long lamellae of a more noble type of wood than the other two layers, and which is oriented in the same direction as the first layer. Hitherto parquet of this type has been produced in a standard stationary press, for example a multi-storey press in which the lamellae in the various layers are laid on top of one another by hand. This is a time-consuming method and furthermore demands very expensive press equipment as it is necessary to have several presses in order that the work may proceed continuously. Naturally, it has long been a wish in the parquet industry to produce laminated parquet in the form of a continuously manufactured sheet. Such a method of production is known in the plywood industry, but hitherto it has not been successful in connection with the production of laminates of the above mentioned type. For the method in question of producing plywood, a gluing press is used which can be moved to and fro. The press is accelerated from its initial position to a synchronous speed with the lamella sheet, and is pressed down onto the sheet when this synchronous speed has been reached and is thereupon driven synchronously with the lamella sheet an expedient distance, after which the pressure is released and the press is returned to its initial position. During the distance the press follows the sheet of plywood, the sheet is supplied with heat from the press, in such a way that the glue hardens.

Attempts have been made to apply this method to the production of laminated parquet, but in practice it has proved impossible to move the press in exact synchronization with the speed of the lamella sheet as it is fed forward, and this is an absolute condition for the success of this method when applied to laminated parquet. If the press moves too fast, a stretching of the lamella sheet in its longitudinal direction will result and the individual lamellae will slide away from one another with the result that cracks will appear across the visible layer. If the press moves too slowly, the lamella sheet will pile up behind press as, in such an event, the lamella sheet moves faster than the press with inevitable destruction of the sheet. Another problem which arises in the production of a continuous sheet of laminated parquet is that of pressing the lamellae together in the longitudinal direction of the sheet. This problem does not apply in the production of plywood as the two outer covering layers at least consist of very large whole sheets of material. A significant problem in the continuous production of laminated parquet is that the middle, transverse lamella layer consists of short, preferably not exceeding 0.5 metre long, small and thin lamellae. The length of these lamellae is limited by the fact that the breadth of the press equipment and the conveyor belt must be kept to a reasonable size. As the material in these thin, short lamellae is usually of very poor quality, in order to keep the price as low as possible, these lamellae will often be broken into two or more pieces when glue is applied to them and they are laid into position in the layer.

The present invention aims at furnishing a method and device for the continuous production of wood laminate of the laminated parquet type, in which the production is trouble-free and entirely continuous without the above mentioned disadvantages arising.

According to the invention, this is achieved by means of a process in which the pressing is carried out by means of a press which can move to and fro in the feed direction of the material, which press carries out the pressing and the heating in order to harden the glue during its movement in the feed direction of the material and which is open during its return movement, and the characteristic feature is primarily that the press is moved forward by the sheet of material itself and that a desired compression of the lamellae across the material sheet is thus achieved.

The above mentioned desired compression of the lamella sheet, is a result of the fact that it is the lamella sheet itself, which is fed forward continuously, which pushes the press from one position to another under the influence of a certain rolling friction between the rollers of the press and the track. In order to maintain complete control over the feed resistance, a variable mechanical resistance may be included which works against the forward feed of the press or the lamella sheet. A mechanical resistance of this type can, for example, consist of friction surfaces which, with a given force, are pressed against the ready glued lamella sheet behind the press.

The lamella sheet arrives at the pressing region ready assembled, glued and partly compressed. When the press is in its most advanced position in the feed direction of the sheet, there will be a section of ready glued and packed lamella sheet behind the press which is supported only by a conveyor belt or a roller conveyor underneath, whilst there is nothing which holds the sheet together from above. In practice, it has proved that the resistance working against the forward feed of the press and the lamella sheet can vary within certain limits. This may be due to the presence of wood particles, dust and the like on the track on which the press runs, which increase the rolling friction, or some glue or the like may adhere to the brake blocks of the above mentioned mechanical friction device with the result that the device during certain periods offers more resistance than usual. As the aforementioned section of lamella sheet approaching the press has not been properly glued inasmuch as the glue has not hardened, this increased resistance can easily result in the entire sheet, or part of the upper layer, bulging upwards, interrupting production. This means reduced production and thus higher costs per square meter of laminate produced.

Many attempts have been made to solve this problem, but it has proved impossible to solve with holding-down devices known hitherto as the section of lamella sheet which has to be held down against the under-surface, varies in length all according to the position of the press. At one moment of time, there will be no free area whilst at the next moment when the press is in its fully advanced position, the free area is a couple of metres long.

This particular problem is solved, according to the invention, by having the press move in the feed direction of the material sheet, weights being continuously applied, distributed along the length of sheet which follows the press, which weights are removed when the press is returned.

The problem of pressing together the above mentioned transverse narrow and thin lamellae of comparatively poor quality to form a close surface is solved, according to the invention, by the first layer of lamellae being fed close against one another on a continuously running conveyor belt with its longitudinal axis in the direction of movement of the belt, and by there thereafter being fed in a second layer of lamellae across the first layer and further layer upon layer up to the required thickness of lamella layer, in that those lamella layers which lie with their axes across the direction of transportation, are coated with glue before they are applied to the under-lying layer, and in that these layers are pressed together by their own weight before the application of glue, in that the lamellae in this layer are fed in a continuous sequence into the gluing device along a smooth inclined plane.

The above mentioned and further features of the invention will be apparent from the following and will be described in more detail with reference to the drawings which in diagram form show a device for the continuous production of laminated parquet.

FIG. 2 shows a plant for the production of laminated parquet seen from the side.

FIG. 3 shows the lamella sheet seen from above and

Figure 1:
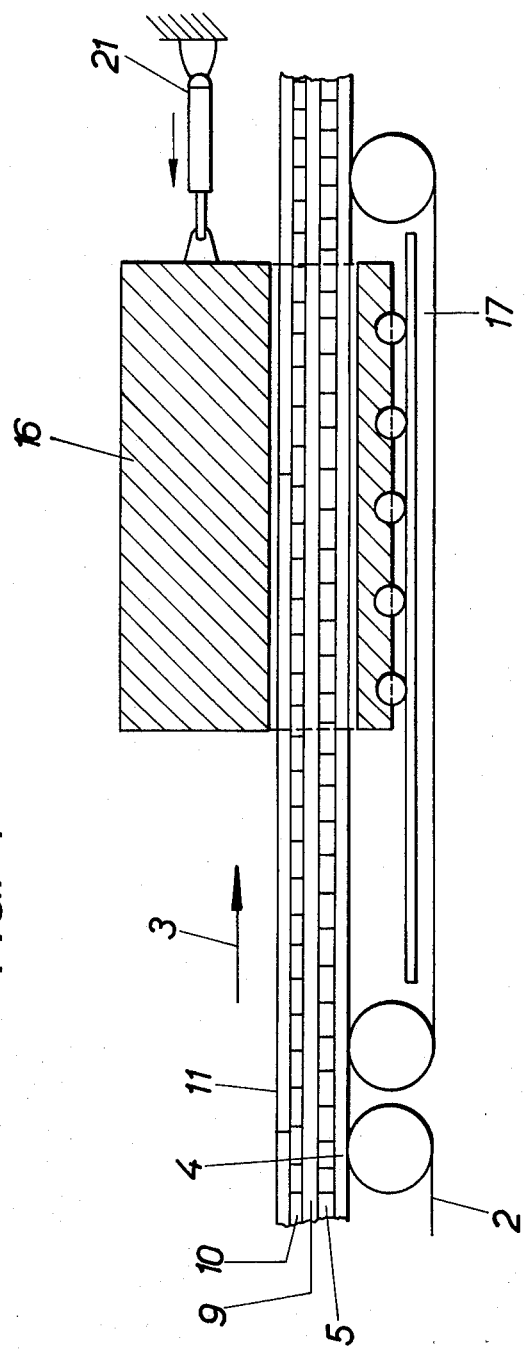
FIG. 1 shows the gluing press together with a part of the row of lamellae in the region near the gluing press.

FIG. 4 like FIG. 2, shows the plant seen from the side in a somewhat modified embodiment compared with FIG. 2.

The various layers in the laminate 1 are prepared in an earlier stage in the production line, not shown in the drawing, and are fed onto a conveyor belt 2 which runs continuously in the direction of the arrow 3. This belt 2 should have a surface with a high coefficient of friction and, for example, consist of rubber. On the belt 2, the first layer 4 is laid consisting of long, thin and relatively narrow lamellae of cheap quality. These lamellae in layer 4 are oriented with their longitudinal axis in the transportation direction 3 of the conveyor belt 2. Onto this layer, a second layer 5 is fed consisting of elongated, thin and narrow lamellae which are posed across the direction of transportation 3. These lamellae 5 are first fed by means of a conveyor belt 6 or the like to an inclined plane 7 and slide down along this by their own weight and are guided in through a gluing device 8 which applies adhesive to both sides of this layer 5. The inclined plane 7 is so designed that the lamellae compress together to form a layer by their own weight with sufficient force to press the individual lamellae close together.

On top of layer 5 a new layer 9 of, for example, hardwood is laid which is to form the visible side of the final product. This layer consists of relatively thin parquet strips accurately worked on all sides. On top of layer 9, a further layer 10 is laid which is identical with layer 5 and which is disposed in the same manner. Also this layer is fed by means of a transport device 11 to an inclined plane 12 and down onto layer 9 through a gluing device 13. Layer 10 is pressed together by gravity in the same way as layer 5. Onto layer 10 there is finally laid a layer 14 which is identical with layer 4 and positioned in the same manner. The lamella sheet 1 is then complete, but the glue has not hardened, nor have the various lamellae been sufficiently compressed together. The middle layer 9 of hardwood has, however, been pressed together in the longitudinal direction by means of a device 15 which can consist of a driven roller having a friction surface or, as shown in FIG. 4, a spiked roller which rotates in the transportation direction with a somewhat higher speed than the conveyor belt 2.

After the lamella sheet 1 has been fully compiled, it is fed into the pressing region of the press 16 which moves to and fro (in the embodiment as shown in FIGS. 1 and 2). This conveyor belt does not have its own drive, but is driven by the lamella sheet itself. Instead of the conveyor belt 17, the lamella sheet 1, in the region between the press and the point where it leaves the conveyor belt, can be supported by a roller belt 18 such as shown in FIG. 4. This roller belt 18 is fixed to a point in the machine stand near the output end of the conveyor belt and runs over a roller 19 fixed to the press, is bent downwards and runs over a second roller 20 which is also fixed to the press 16. After this, the roller belt 18 is bent back into the horizontal position and is anchored in the machine stand. In this manner, when the press 16 moves to the right in FIG. 4, a roller belt will be laid out under the lamella sheet 1 and the belt will be removed again when the press moves to the left.

The press is brought to its initial position, as shown with the dashed and dotted line in FIG. 2, by means of an expedient device, for example a ram 21. At this point, the press is brought to bear against the lamella sheet and is driven in the direction of transportation 3 to the left in the figure, by the lamella sheet itself. During the movement from the position which is shown by the dashed and dotted line to the position which is shown with the full line in FIG. 2, the glue in the lamella sheet is subjected to considerable heat, for example by means of high frequency heating, the various layers in the laminate sheet are pressed forcefully together, and the glue hardens. The lamella sheet is thus ready glued and hardened when it leaves the press 16.

The lamella sheet 1, which may have a width of, for example, 0.5 metre, is divided into suitable lengths of, for example, 3 metres. This 3 metre long lamella package is then divided longitudinally into, for example, three smaller pieces. These three pieces are then divided along a horizontal plane in the middle of the hardwood layer 9. In order that the parquet strips prepared in this manner will be easy to lay, they are provided with tongue and groove on their long sdes and ends. In order to avoid using the expensive hardwood for that piece where the tongue is to be made, thin, narrow wooden laths of a cheaper type of wood are inserted into the hardwood layer 9. Similarly, in the middle layers 5 and 10, somewhat broader lamellae 19 may be inserted at those places where the lamella sheet is to be sawn lengthwise. This is done in order that the fibres will run longitudinally in all those layers which at their ends are to be formed into tongues and grooves.

In order to achieve an even pressure against the press, and also a compression of the hardwood lamellae in the longitudinal axis of the conveyor belt, there may in addition to the conveyor belt 2, be included a further conveyor belt 22 which is positioned nearer the press 16. The first belt 2 is driven at a somewhat higher speed than belt 22.

Before the lamella sheet is pressed and heated by the press 16 in order to harden the glue, the individual lamellae must be pressed together across the sheet similar to the lengthwise compression described above. This is achieved quite simply by means of pressing devices (not shown in the drawing), which are guided in towards the sheet from both sides and which press together those lamellae which are oriented along the sheet. With such a compression operation, however, there arises the danger of the lamellae being pressed out of position. This is eliminated, according to the invention, in that the press in its initial position is first brought together over the material sheet with a small clearance down to the sheet, and in that the material sheet with the press in this position, is pressed together by the pressing devices operating from the sides and in that the press is then brought into full engagement against the material sheet.

As already described, the press 16 is pushed forward by the material sheet itself with the result that one thus achieves a desired compression of the lamellae. In order to hold the individual lamellae in the lamella sheet in their proper places there is, at the output end of the conveyor belt 22, on the upper-side of the lamella sheet disposed a press-down roller 23. However, as the press 16 moves away from this roller, there will be a considerable section of the lamella sheet 1 lying open without any support from above. In order to prevent the lamella sheet, in the event of varying resistance against the movement of the press 16, bulging upwards and cracking, weights 24 are arranged above the sheet 1, these weights being linked together to form a chain which, near the roller 23, is fixed to the machine stand and which runs over two deflecting rollers 25 and 26 on the press 16. The other end of the chain of weights 24 is fixed to the machine stand above the press 16. In order to achieve a controlled and adequate resistance against the forward feed of the lamellae sheet 1, and thus a sufficient compression of the lamellae, behind the press 16 there is disposed a friction device 27 which may consist of a fixed shoe and a sprung shoe which both press against the lamella sheet from the underside and overside respectively.

Having described my invention, I claim:

1. A process for pressing wood laminate material for forming laminated parquet comprising the steps of forming a multi-layer laminate of lamellae and applying glue to the lamellae, supporting the laminate in the horizontal position, continuously feeding the laminate along a horizontal feed path, applying a pressing and heating action to a specific length of the laminate for effecting compression of the laminate and hardening of the glue, wherein the improvement comprises applying the pressing and heating action in the path of the continuous feeding of the laminate, and maintaining the pressing and heating action on the specific length of the laminate for a predetermined length of travel as it is continuously fed solely by the feeding action applied to the laminate upstream from the location of the pressing and heating action, and removing the pressing and heating action from the laminate after the predetermined length of travel for pressing and heating has been accomplished.

2. A process, as set forth in claim 1, wherein the step of feeding the laminate comprises continuously moving a horizontal support surface in the feed direction, and the step of forming the multi-layer laminate comprises continuously depositing a first layer of lamellae extending in the feed direction on the support surface, continuously depositing a second layer of lamellae on the first layer with the lamellae of the second layer extending transversely across the feed direction of the laminate, applying adhesive to the surfaces of the lamellae forming the second layer, repeating the application of first and second layers with the application of the adhesive only to the surfaces of the second layers until the desired number of layers of the laminate are formed, and supplying the lamellae forming the second layers from a position above the support surface down an inclined surface with the individual lamellae in side-by-side contacting relationship so that the weight of the lamellae on the inclined surface presses the lamellae of the second layer together prior to the application of the adhesive.

3. A process, as set forth in claim 2, comprising the step of depositing an intermediate first layer of lamellae formed of a hard wood on a second layer of lamellae for forming the finish parquet surface, and splitting the laminate after the completion of the pressing and heating action along a plane extending through the intermediate first layer formed of hard wood to provide two sheets having a finish parquet surface.

4. A process, as set forth in claim 3, comprising the step of inserting transversely spaced longitudinally extending lamellae in the intermediate layer of hard wood with the inserted lamellae being of a lower grade of wood than the hard wood forming the intermediate layer, and sawing the laminate longitudinally after the completion of the pressing and heating step in the longitudinal direction through the inserted longitudinally extending lamellae.

References Cited
UNITED STATES PATENTS

| | | | |
|---|---|---|---|
| 3,177,568 | 4/1965 | Schweiker | 156—561 |
| 3,389,038 | 6/1968 | Robison | 156—503 |
| 3,255,067 | 6/1966 | Sontheim et al. | 156—522 |
| 3,272,680 | 9/1966 | Paasche | 186—160 |

BENJAMIN A. BORCHELT, Primary Examiner

J. V. DORAMUS, Assistant Examiner

U.S. Cl. X.R.

156—556, 522